Dec. 1, 1936.  H. S. JANDUS ET AL  2,062,314
BUMPER CLAMP AND GUARD CONSTRUCTION
Filed May 26, 1934  2 Sheets-Sheet 1
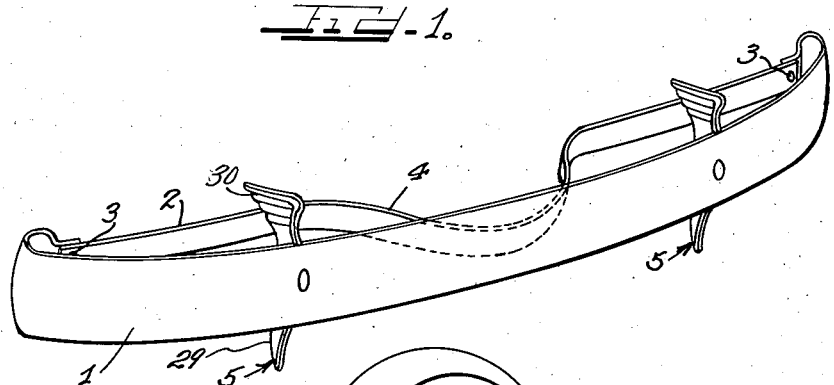
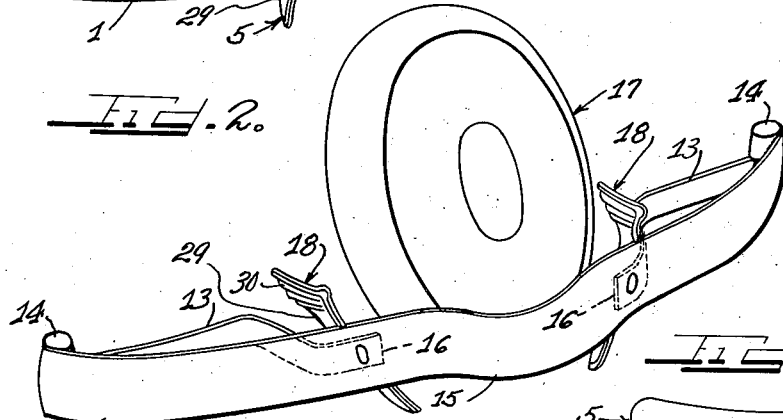
Inventors
Herbert S. Jandus.
Norman Y. Kristensen.
by Charles Bill Attys.

Dec. 1, 1936. H. S. JANDUS ET AL 2,062,314
BUMPER CLAMP AND GUARD CONSTRUCTION
Filed May 26, 1934 2 Sheets-Sheet 2
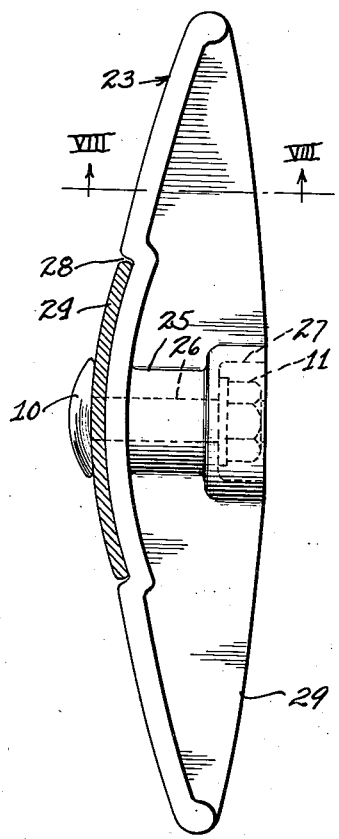
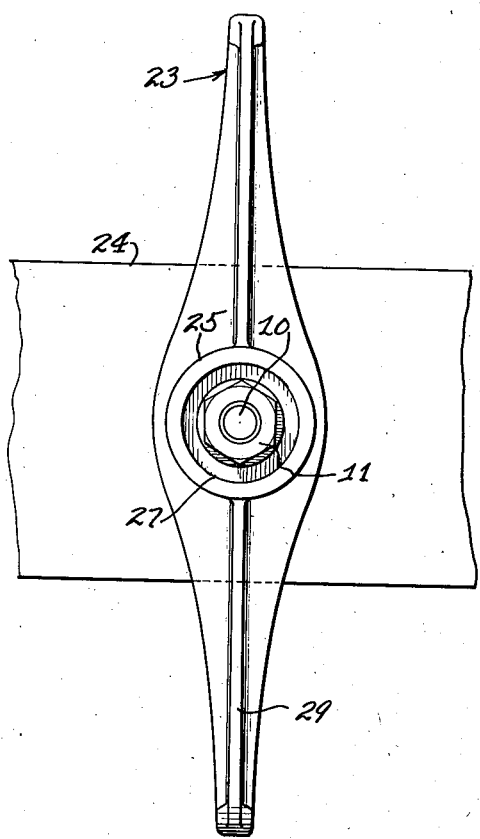
Inventors
Herbert S. Jandus.
Norman Y. Kristensen.
by Charles Bell Attys.

Patented Dec. 1, 1936

2,062,314

UNITED STATES PATENT OFFICE 2,062,314

BUMPER CLAMP AND GUARD CONSTRUCTION

Herbert S. Jandus and Norman Y. Kristensen, Detroit, Mich., assignors to General Spring Bumper Corporation, Detroit, Mich., a corporation of Michigan Application May 26, 1934, Serial No. 727,672

3 Claims. (Cl. 293—55)

This invention has to do with bumpers and is concerned more particularly with an attachment therefor for the purpose of preventing interlocking between bumpers of adjacent vehicles.

It is an object of the invention to provide a bumper guard to be applied to the impact bar of a bumper so as to prevent another bumper from engaging over or under the bumper to which the device is attached.

It is another object of the invention to provide a bumper guard whose major width, when attached to an impact bar of a bumper, is generally parallel to the longitudinal axis of the vehicle on which the bumper is mounted.

It is a further object of the invention to locate such a guard at the rear of the impact bar so that the impact face of the impact bar may be substantially uninterrupted.

It is a further object of the invention to employ such a guard as a clamp for holding the impact and back bars in properly assembled relation.

It is a further object of the invention to arrange a pair of guards of this character so as to straddle and extend in general parallelism to the outer periphery of a spare wheel, tire and cover protected by the bumper at the rear of the automobile.

It is another object of the invention to provide a bumper with a guard of this character and of such construction that the guard is stream-lined in harmony with the automobile itself and affords maximum strength and stiffness in the direction of impact.

In accordance with the general features of the invention, the guard is formed of a length substantially greater than the width of the impact bar and recessed forwardly to fit the rear surface and upper and lower edges of the impact bar and to extend substantially above and below the impact bar so as to engage the bumper of another car and prevent the latter bumper from interlocking with the bumper on which the guard is mounted. Bolts or other suitable means may be employed for securing the guard to the impact bar. The guard is formed in a stream-line design of aerofoil shape in cross section. Preferably a pair of guards is employed, with the guards arranged on opposite sides of the center of the impact bar. The guards may also be employed to clamp the impact and back bars together, and in the case of a bumper construction wherein back bar sections are employed in spaced relation to allow space for a rear wheel and tire, such guards may not only clamp the impact and back bars together but also may be positioned to extend generally parallel to the adjacent outer periphery of the tire and wheel to provide a partial frame for the spare wheel and tire as well as to provide a protection for the outer periphery of the wheel, tire and cover should the latter be mounted thereon.

The guard may be formed of any suitable material but is preferably made of a casting or forging, and may be given any desired ornamental design. The guard construction is accordingly extremely simple and may be mounted on the bumper by bolt means or other suitable means.

Other objects and advantages of the invention will appear as the description proceeds.

This invention (in preferred forms) is illustrated in the drawings and hereinafter more fully described.

On the drawings:

Figure 1 is a perspective view of one form of the invention.

Figure 2 is a perspective view of another form of the invention for employment in conjunction with the rear mount of a spare wheel, tire and cover.

Figure 3 is a rear fragmentary elevational view of one of the guards and associated bumper structure of Figure 1.

Figure 4 is a sectional view taken substantially in the plane designated by the line IV—IV in Figure 3.

Figure 5 is a view similar to Figure 4 but shows the assembly of the guard with the impact and back bars as they appear in the form of Figure 2.

Figure 6 is an enlarged sectional view through an impact bar and shows another form of guard associated therewith.

Figure 7 is a fragmentary front elevation of Figure 6.

Figure 8 shows the shape of a section taken substantially in the plane designated by the line VIII—VIII in Figure 6.

Figure 9 is a view similar to Figure 8 but of a modified sectional design of guard.

As shown on the drawings:

Referring now more particularly to the drawings, the invention is shown in Figure 1 applied to a bumper comprising an impact bar 1 and a back bar 2, the ends of the bars being connected at 3 as by bolts or in any other suitable manner. The central portion 4 of the back bar may be bulged forwardly adjacent the central portion of the impact bar 1 to prevent excessive yield to said portion of the impact bar, and the bars may be centrally connected if desired. This bumper construction is purely illustrative, since the invention is of such character as to be employed with substantially any type of impact and back bar construction and, for that matter, is susceptible of being employed in conjunction with an impact bar independently of any back bar.

The guard 5 shown in Figures 1, 3 and 4 is of generally triangular form in side elevation and is of a length substantially greater than the width of the impact bar 1 so as to project substantially above and below the impact bar to thus engage the bar of an adjacent vehicle and prevent said bars from interlocking. The guard 5 has a depression in one of its longer triangular sides as shown at 6 to accommodate the impact bar 1 and to engage the upper and lower edges of the impact bar so as to be interlocked therewith. In cross-section, the guard 5 is preferably of substantially aerofoil design with its blunt portion 7 foremost, the portions of the blunt part above and below the impact bar 1 and adjacent the same being shaped to afford a substantial continuation of the impact surface of the impact bar as shown in Figures 1 and 4.

The guard 5 is thus of substantially greater extent, rearwardly, than in the direction parallel to the impact bar, because of the rearwardly extending fin or wing 29 so as to provide an increased stiffness, afford maximum strength consistent with its stream-line design, and thus substantially reduce its conspicuity or prominence when viewed from the front of the bumper to which the same is attached. The upper end of the fin 29 is progressively thickened in steps, as is indicated by the numerals 30.

To the end that the guard 5 may be securely fastened to the impact bar 1, the guard 5 is provided substantially centrally thereof with an enlargement 8 having a bore 9 arranged to register with a corresponding hole in the impact bar 1 for the reception of a bolt 10 whose head is preferably placed against the impact bar 1 and whose shank extends rearwardly through the impact bar and guard 5, projecting rearwardly thereof and receiving a lock washer and nut 11 whereby the parts are held in properly assembled relation.

In the form of the invention appearing in Figures 2 and 5, the impact bar 12 and back bar sections 13 are pivotally connected at 14 or otherwise suitably secured together at the ends of the bumper. The impact bar 12 is preferably offset downwardly at its central portion 15 to harmonize with the spare tire and cover to be protected thereby as well as to be disposed adjacent the lower end of the spare tire and cover for protective purposes. The back bar sections 13 are formed to terminate at 16 adjacent the ends of the offset portion 15 of the impact bar so as to provide space for the reception of the spare tire and cover, the latter being shown generally at 17.

Bumper guards 18 of substantially the same construction as the guards 5 are employed to form a partial frame for the adjacent outer peripheral portion of the cover 17 and at the same time serve as a means for clamping the impact and back bar sections together. To this end, each guard 18 is provided with stepped depressions 19 and 20, each provided respectively for the reception of the impact bar 12 and back bar 13, said depressions being respectively longer than the minimum width of the respective bars because of the fact that the guards 18 are preferably arranged obliquely to said bars so as to be inclined in general parallelism with the adjacent outer periphery of the cover 17. Each guard 18 is provided with an enlargement 21 having a bore 22 arranged to register with a corresponding hole in the impact bar 12 for the reception of a bolt 10, the parts being held in properly assembled relation by means of the nut 11 and associated structure.

It will be observed that the guards 18 have all of the attributes of the guards 5 and in addition serve to protect the cover 17 above the impact bar 12, at the outer periphery of the cover.

A somewhat modified form of the invention is shown in Figures 6 and 7, both as to ornamental design and as to structural features. The guard 23 where it projects above and below the impact bar 24 is of generally stream line form as illustrated in Figure 8 and, if desired, instead of being substantially T-shaped in cross-section, the same may have the aerofoil section shown in Figure 9 at 23a. The upwardly and downwardly projecting portions of the guard 23 and the guard 23a are preferably relatively narrow so as to be as inconspicuous as possible when the bumper is viewed from the front, and extend rearwardly to a substantial extent for the purpose of strength and stiffness. The guard 23 and the guard 23a are preferably formed with a boss 25 which may be of generally cylindrical form having a bore 26 and a counterbore 27 rearwardly of the bore 26. The guard 23 and guard 23a are also preferably provided with a front depression 28 for receiving and cooperating with the impact bar 24 in a manner hereinabove described in connection with other forms of the invention. The bumper 24 is provided with a hole with which the bore 26 is adapted to register, and a bolt 10 passed rearwardly through the impact bar and bore 26 to terminate at the rear part of the counterbore 27, where a lock washer and nut 11 are applied to the free end of the bolt 10. The counterbore 27 is of such size as to provide ample space for the insertion of a socket wrench to engage the nut 11. The parts are so arranged that when they are properly assembled as illustrated, the bolt and nut are substantially within the confines of the counterbore 27, thus eliminating substantially projecting parts.

It is to be understood that the guard 23 or 23a may be employed in place of the guards 5 of Figure 1 and may be modified to take the place of the guards 18 of Figure 2.

The bumper of Figure 2 may be mounted at the front as well as at the rear of the automobile and it is to be appreciated that the cover may also be at the front.

We are aware that many changes may be made and numerous details of construction may be varied through a wide range without departing from the principles of this invention, and we, therefore, do not purpose limiting the patent granted hereon otherwise than necessitated by the prior art.

We claim as our invention:

1. An elongated and horizontally extending bumper bar of a substantially flat or slightly curved vertical section, a vertically extending and elongated guard secured on the rear vertical face of said bar to provide a front impact face substantially flush with the front face of said bar and extending above and below said bar, said guard having a vertically extending impact receiving member provided with an offset defining a recess receiving said bar and defining top and bottom shoulders in engagement with said bar to maintain said bar and said guard in aligned relation, an integrally formed rib extending normally and rearwardly of said impact receiving member, said rib having a thickened and apertured portion within the zone of the offset portion of said impact receiving member, and a bolt entered through said bar and said thickened portion to hold said guard and said bar in secured relation.

2. In a bumper bar and guard assembly in which a guard is secured on the rear of the bumper bar with the impact face of the guard substantially flush with, and extending above and below the impact face of the bar, a guard comprising a vertically extending impact member provided with an offset portion intermediate its ends to receive a bumper bar and to define a pair of shoulders for engagement with the bar to maintain the bar and the guard in aligned relation, and an integrally formed rib extending rearwardly and normally of said impact member, said rib having a thickened portion within the zone of the offset portion of said impact member, said offset portion and said thickened portion being bored whereby a bolt may be passed through the bumper bar and the guard to hold them in clamped relation.

3. A bumper guard comprising a vertically extending impact receiving member provided with an offset portion to define a recess to receive a bumper bar and to provide top and bottom shoulders to engage the bar, an integrally formed and rearwardly and normally extending rib, said rib being progressively thickened in steps about its upper end, said rib also having a thickened portion forming a boss in the zone of the offset portion of said impact receiving member, said offset portion and said boss being bored whereby a bolt may be passed through a bumper bar and the guard to hold them in assembled relation.

HERBERT S. JANDUS.
NORMAN Y. KRISTENSEN.